(12) United States Patent
Darling et al.

(10) Patent No.: US 8,980,212 B1
(45) Date of Patent: Mar. 17, 2015

(54) FLUE GAS STREAM BYPASS DURING SELECTIVE CATALYTIC REDUCTION IN A POWER PLANT

(71) Applicant: ALSTOM Technology Ltd, Baden (CH)

(72) Inventors: Scott L. Darling, Avon, CT (US); Mitchell B. Cohen, West Hartford, CT (US); Todd D. Hellewell, Windsor, CT (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/972,256

(22) Filed: Aug. 21, 2013

(51) Int. Cl.
*B01D 53/56* (2006.01)
*F01N 3/20* (2006.01)

(52) U.S. Cl.
CPC ............ *B01D 53/565* (2013.01); *F01N 3/2053* (2013.01)
USPC ...................... 423/242.1; 423/239.1; 422/168; 422/176; 422/177; 422/180

(58) Field of Classification Search
CPC .............................. B01D 53/565; F01N 3/2053
USPC ............ 423/239.1, 242.1; 422/168, 176, 177, 422/180
See application file for complete search history.

(56) References Cited

U.S. PATENT DOCUMENTS

| 4,521,388 | A | * | 6/1985 | Samish et al. ................. 423/235 |
| 4,744,967 | A | * | 5/1988 | Brand et al. ............... 423/239.1 |
| 5,943,865 | A | | 8/1999 | Cohen |
| 7,481,987 | B2 | * | 1/2009 | Maziuk, Jr. ................. 423/215.5 |
| 8,107,080 | B2 | | 1/2012 | Socha et al. |
| 8,506,893 | B2 | * | 8/2013 | Gandhi et al. ................. 422/171 |
| 2003/0157007 | A1 | | 8/2003 | Samant et al. |
| 2013/0108528 | A1 | * | 5/2013 | Geveci et al. ................. 423/212 |
| 2014/0134061 | A1 | * | 5/2014 | Broderick et al. ............ 422/169 |

FOREIGN PATENT DOCUMENTS

| DE | 35 05 349 A1 | 8/1986 |
| EP | 2 320 044 A1 | 5/2011 |
| WO | 01/00303 | 1/2001 |
| WO | 01/10539 | 2/2001 |

OTHER PUBLICATIONS

U.S. Appl. No. 13/477,158, Unpublished (filed May 22, 2012 (Mitchell B Cohen et al, applicant).
U.S. Appl. No. 13/464,963, Unpublished (filed May 5, 2012 (Mitchell B Cohen et al, applicant).
International Search Report and The written Opinion of the International Searching Authority, dated Oct. 24, 2014 for International Appln. No. PCT/US2014/048824.

* cited by examiner

*Primary Examiner* — Timothy Vanoy
(74) *Attorney, Agent, or Firm* — Robert D. Crawford

(57) ABSTRACT

A system includes a selective catalytic reactor and a bypass line. The selective catalytic reactor is located downstream of a furnace that generates flue gases. The selective catalytic reactor reduces nitrogen oxides to nitrogen. The bypass line is in fluid communication with the selective catalytic reactor. The bypass line contacts an input line to the selective catalytic reactor, where the bypass line is adapted to handle a volume of flue gases diverted from the selective catalytic reactor. A first control damper is disposed at an inlet to the selective catalytic reactor; and a second control damper is disposed at an inlet to the bypass line. The first control damper and the second control damper interact to divide the flue gas stream between the selective catalytic reactor and the bypass line in a ratio to reduce the amount of sulfur trioxide released from the system to a desirable value.

11 Claims, 2 Drawing Sheets

FLUE GAS STREAM BYPASS DURING SELECTIVE CATALYTIC REDUCTION IN A POWER PLANT

TECHNICAL FIELD

This disclosure relates to a flue gas stream bypass during selective catalyst reduction in power generation facilities.

BACKGROUND

During the combustion process, flue gases generated from furnaces contain nitrogen oxides ($NO_x$). It is desirable to reduce $NO_x$ emissions into the atmosphere. One post-combustion process for the lowering of $NO_x$ emissions is that of selective catalytic reduction (SCR). Selective catalytic reduction systems use a catalyst and a reactant such as ammonia gas, $NH_3$, to dissociate $NO_x$ to molecular nitrogen, $N_2$, and water vapor. A utility steam generating power plant having, for example, a fossil fuel-fired furnace may utilize selective catalytic reduction (SCR) as a $NO_x$ reduction technique. The furnace generally comprises a furnace volume in fluid communication with a backpass volume. Combustion of hydrocarbon fuels occurs within the furnace volume creating hot flue gases that rise within the furnace volume giving up a portion of their energy to the working fluid of a thermodynamic steam cycle. The flue gases are then directed to and through the backpass volume wherein they give up additional energy to the working fluid. Upon exiting the backpass volume the flue gases are directed via a gas duct through a selective catalytic reduction chamber and thence to an air preheater and flue gas cleaning systems thence to the atmosphere via a stack.

In a SCR system, at some point in the gas duct after the flue gas stream exits the back pass volume and upstream of the SCR chamber, a reactant, possibly ammonia, in a gaseous form, or a urea/water solution is introduced into, and encouraged to mix with, the flue gas stream. The reactant/flue gas mixture then enters the SCR chamber wherein the $NO_x$ reduction takes place between the reactant and the flue gas mixture in the presence of the catalytic surfaces. The introduction of the ammonia or urea into the flue gas stream is generally achieved by the use of injector atomizing nozzles located at either the periphery of the gas duct, or immersed on injection lances within the flue gas stream.

While the SCR facilitates the reduction of $NO_x$, sulfur trioxide ($SO_3$) emissions are increased because the catalyst used for the $NO_x$ reduction, promotes oxidation of incoming sulfur dioxide ($SO_2$) to sulfur trioxide ($SO_3$). $SO_3$ emissions at the stack must be limited to very low levels (below 5 ppm) to avoid excess opacity and/or a visible blue plume.

Downstream of the SCR, $SO_3$ emissions are partially reduced by condensation in the combustion air preheater and captured in the particulate and $SO_2$ control equipment. If this reduction proves insufficient, specific $SO_3$ control measures are generally added to the process. One additional control measure is the addition of a spray dry absorber upstream of the flue gas desulfurization equipment (for removing both $SO_2$ and $SO_3$). Another is the addition of a condensing heat exchanger upstream of an electrostatic precipitator where the $SO_3$ is captured by the fly ash/condensate. Other methods include dry or wet sorbent injection using ammonia, lime, sodium bicarbonate, trona, and the like. All of these methods add both capital and operating cost. It is therefore desirable to reduce the $SO_3$ emissions to the atmosphere cost effectively with a minimum of capital expended on additional control equipment

SUMMARY

Disclosed herein is a system comprising a selective catalytic reactor; where the selective catalytic reactor is located downstream of a furnace that generates flue gases; the selective catalytic reactor being operative to reduce nitrogen oxides to nitrogen; a bypass line; the bypass line being in fluid communication with the selective catalytic reactor; the bypass line contacting an input line to the selective catalytic reactor, where the bypass line is adapted to handle a volume of flue gases that are diverted from the selective catalytic reactor; a first control damper disposed at an inlet to the selective catalytic reactor; and a second control damper that is disposed at an inlet to the bypass line; where the first control damper and the second control damper interact to divide the flue gas stream between the selective catalytic reactor and the bypass line in ratio that is effective to reduce the amount of sulfur trioxide released from the system to a desirable value.

Disclosed herein too is a method comprising discharging a flue gas stream from a furnace to a system comprising: a selective catalytic reactor; where the selective catalytic reactor is located downstream of a furnace that generates flue gases; the selective catalytic reactor being operative to reduce nitrogen oxides to nitrogen; and a bypass line; the bypass line being in fluid communication with the selective catalytic reactor r; the bypass line contacting an input line to the selective catalytic reactor, where the bypass line is adapted to handle a volume of flue gases that are diverted from the selective catalytic reactor; dividing the flue gas stream between the selective catalytic reactor and the bypass line in a ratio that is effective to reduce the amount of sulfur trioxide released from the system to a desirable value.

DETAILED DESCRIPTION

Disclosed herein is a system for reducing $SO_3$ emissions comprising a selective catalytic reactor and a bypass line to the selective catalytic reactor that permits the flue gases to bypass the selective catalytic reactor. The selective catalytic reactor facilitates the reduction of $NO_x$ present in the flue gas stream (emanating from the furnace) while the bypass line prevents or minimizes the conversion of $SO_2$ into $SO_3$ that generally occurs across the catalyst in the selective catalytic reactor with the consequent increase in the $SO_3$ that is released to the atmosphere. Permitting a portion of the flue gas stream to bypass the selective catalytic reactor facilitates a reduction in the $SO_3$ leaving the power plant. The use of a bypass line therefore facilitates reducing the amount of flue gas that passes through the selective catalytic reactor, thus permitting a reduction in the size of the selective catalytic reactor by an amount of up to 30%.

Figure 1:
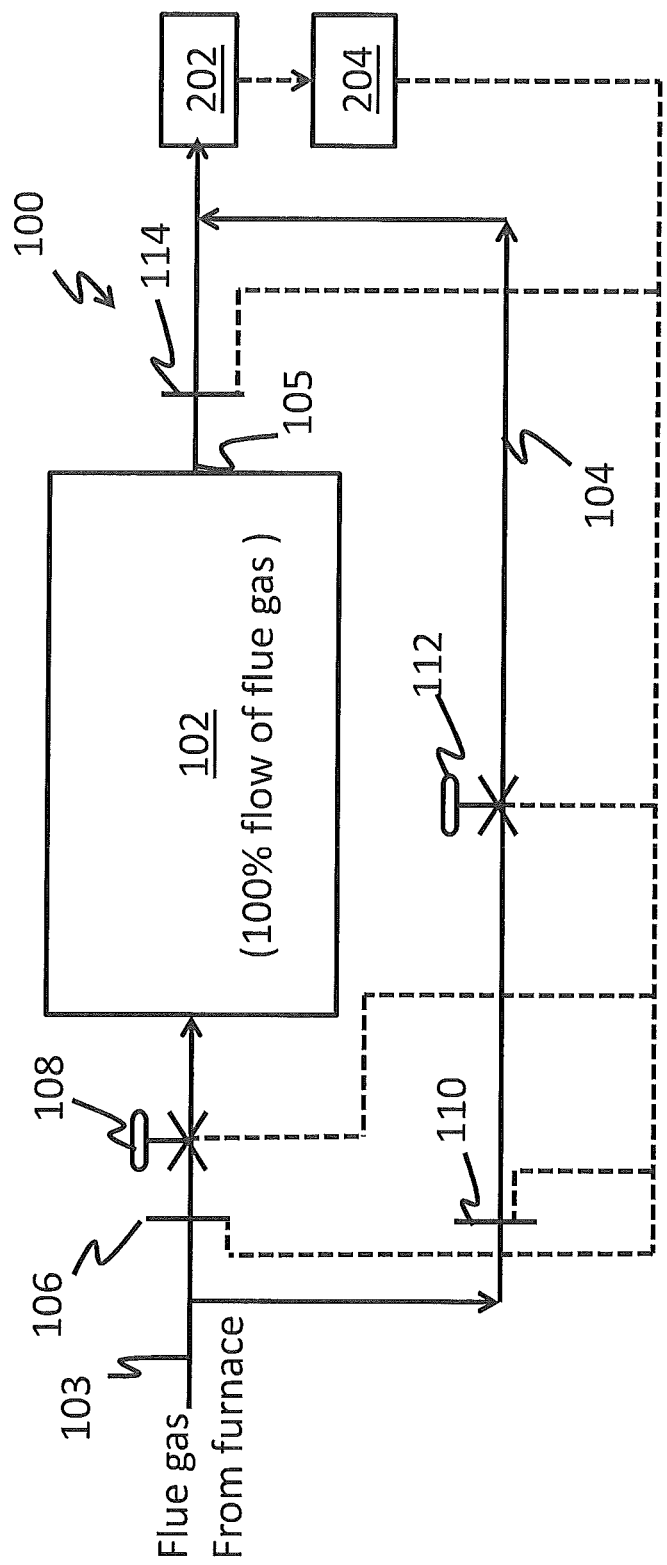
FIG. 1 is a depiction of a system having a bypass line around a selective catalytic reactor.

With reference now to the FIG. 1, the system 100 comprises a selective catalytic reactor 102 and a bypass line 104. The selective catalytic reactor 102 (hereinafter SCR 102) lies downstream of a furnace (not shown) from which flue gases emanate. The SCR of the FIG. 1 is scaled to catalytically reduce 100% of the flue gas flow. The flue gases may pass through particulate collection devices such as electrostatic precipitators or fabric filters (not shown) and flue gas desulfurization equipment (not shown) after contacting the system 100. The flue gas enters the SCR 102 via input line 103 and exits the SCR 102 via output line 105. The input line 103 contains a first isolation damper 106 and a first control damper 108. The first control damper 108 lies downstream of the first isolation damper 106, though in other embodiments, it may lie upstream of it. A second isolation damper 114 lies downstream of the SCR 102 on the output line 105.

The bypass line 104 contacts the input line 103 at a point upstream of the first isolation damper 106 and contacts the output line 105 at a point downstream of the second isolation damper 114. The bypass line 104 also comprises an optional third isolation damper 110 and a second control damper 112, with the third isolation damper 110 lying upstream of the second control damper 112. In an embodiment, the second control damper 112 lies upstream of the third isolation damper 110. The isolation dampers 106, 110 and 114 each function to completely cut off the flow of flue gases in the line on which the respective isolation damper is disposed. The control dampers 108 and 112 can be variably adjusted to permit a selected percentage of the flue gas flow to proceed downstream of the respective control damper. The open position of the dampers can be set and automatically controlled according to unit load (i.e., MW rating). In addition, all of the isolation dampers and the control dampers can be manually adjusted or automatically activated and controlled. Both the isolation dampers and the control dampers may be electrically activated or pneumatically activated using actuators (not shown).

In an embodiment, the system 100 may comprise an optional $SO_3$ analyzer 202 disposed downstream of the SCR 102. The $SO_3$ analyzer is in operative communication with an optional controller 204 that is in operative communication with one or more of the isolation dampers 106, 110 and 114. The controller 204 is also in operative communication with one or more of the control dampers 108 and 112. The $SO_3$ analyzer 202 measures the amount of $SO_3$ in the flue gas stream and transmits this information into the controller 204. The controller 204 in turn facilitates adjusting the isolation dampers 106, 110 and 114 and the control dampers 112 and 114 to determine the percentage of the flue gas stream that is directed to the SCR and the percentage that is directed to the bypass (thereby bypassing the SCR). The controller 204 may be a computer, a microprocessor, or the like, and may contain software that is capable of compiling and retaining statistics on the type of fuel input and its relationship with the $SO_3$ content present in the flue gas stream. The controller 204 may also be capable of maintaining a correlation between the type of fuel input to the furnace and actuator (where the actuators are used on the respective isolation dampers and the respective control dampers) positions.

The controller 204 transmits messages to one or more actuators (not shown) that control the isolation dampers and/or to the control dampers. The communication between the controller 204 and the respective isolation dampers and the control dampers is shown by dotted lines in the FIG. 1 (and in the FIG. 2, which will be detailed later). It is to be noted that the dampers can be controlled manually without any automation when the system does not contain analyzers and controllers. This is detailed later as well.

In one embodiment, in one method of operating the system 100 of the FIG. 1, the first isolation damper 106 may first be set to a closed position to permit the initial flue gas stream emanating from the furnace (that contains contaminants such as unburned carbon, oil mist carryover, and the like) to travel through the bypass line 104. This prevents potential fires and/or degradation of the catalysts that are used in the SCR 102. After the contaminated flue gas stream is discharged from the system 100, the flue gas stream (without contaminants that can degrade catalyst reactivity within the SCR 102) is then discharged through the SCR 102.

The first isolation damper 106 and the first control damper 108 permit the entire volume of flue gas from the furnace to travel along input line 103 to the SCR 102. The first isolation damper 106, the first control damper 108 and the second isolation damper 114 are completely opened during this portion of the process. The third isolation damper 110 is completely closed. The flue gas stream 102 travels through the SCR 102 and in the presence of the reactant, ammonia is catalyzed to dissociate $NO_x$ to molecular nitrogen, $N_2$, and water vapor. Some of the $SO_2$ present in the flue gas stream is converted to $SO_3$ during the catalytic reduction of the $NO_x$.

The analyzer 202 measures the $SO_3$ content in the flue gas stream emanating from the SCR 102 along the output stream 105. It is to be noted that the analyzer 202 may be a manually operated wet chemistry laboratory, where a sample of flue gas (after being treated by the SCR 102) is periodically collected in a device such as a bottle or bag and then analyzed via wet chemistry. In such a case, adjustments to the dampers (both the isolation and control dampers) are made manually.

In another embodiment, the analyzer 202 may be an automated chemical analyzer that is disposed in the flue gas stream and measures the sulfur trioxide content in-situ. If the $SO_3$ content is above an acceptable limit, then the controller 204 (which is automated) transmits a message to the controller 204 which activates the control dampers 108 and 112 respectively. In an embodiment, some of the dampers may be controlled automatically while others may be controlled manually.

In any event (when using either manual analysis or automated analysis), the first control damper 108 and the second control damper 112 are adjusted (i.e., partially opened) to prevent the entire amount of the flue gas stream from entering the SCR 102. A portion of the flue gas stream flows through the bypass line 104. In an embodiment, the first control damper 108 is partially opened to prevent an amount of up to 30% of the flue gas stream from entering the SCR 102 and instead letting it enter into the bypass line 104. The second control damper 112 may be either completely opened at this stage or it may be partially opened to maintain the appropriate amount of back pressure in the lines 103 and 104. During this configuration, the isolation dampers are all opened and the flow of the gases is controlled by the control dampers. The position of the control dampers can be adjusted (from the closed position) until the amount of $SO_3$ in the flue gas stream is reduced to the desirable value. In one embodiment, the amount of $SO_3$ in the flue gas stream after remediation in the system 100 is less than or equal to 5 ppm, preferably less than 3 ppm.

Figure 2:
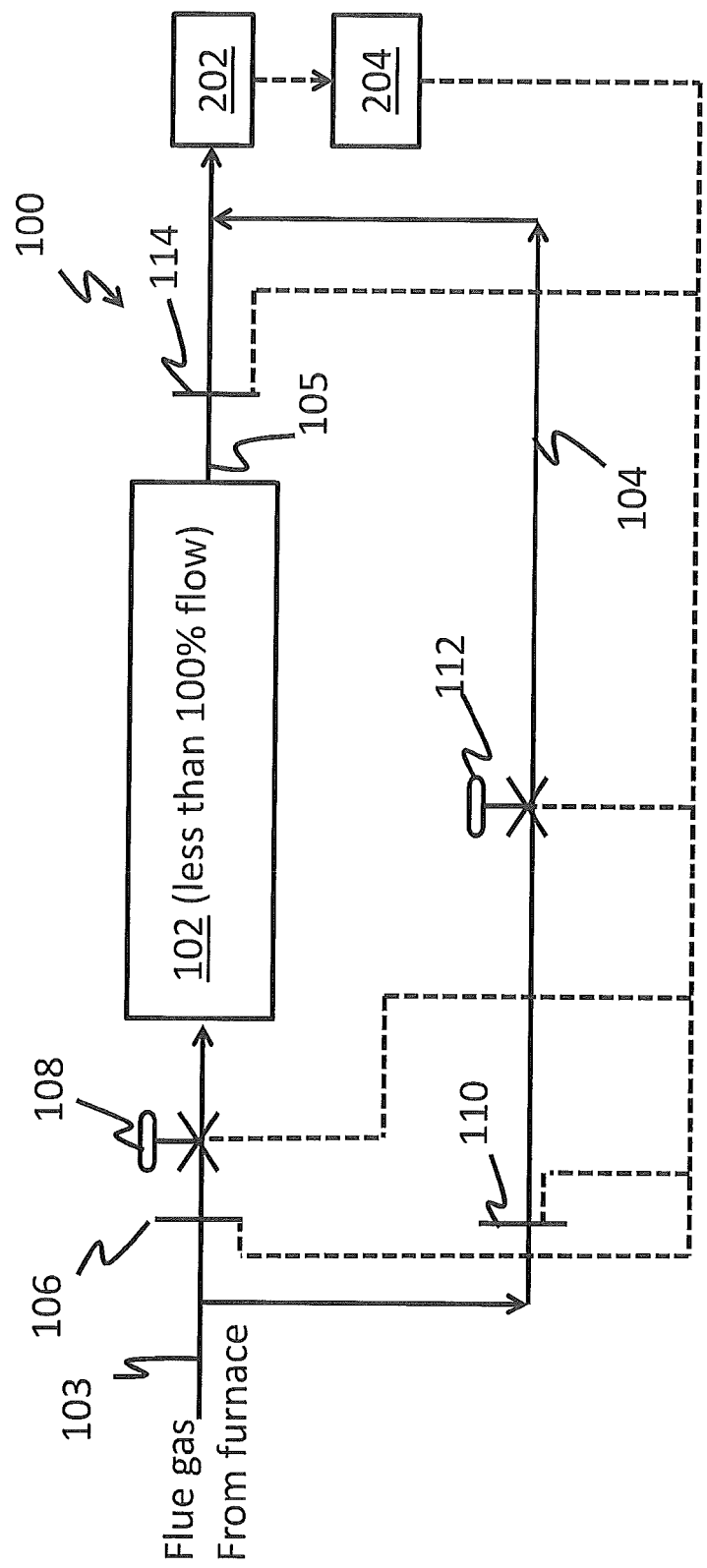
FIG. 2 is a depiction of the system of the FIG. 1, with a reduced size selective catalytic reactor.

In one embodiment depicted in the FIG. 2, since the amount of flue gas passing through the SCR 102 is reduced, it may be desirable to reduce the size of the SCR reactor. The FIG. 2 depicts a SCR 102 of a size reduced from that of the SCR 102 in the FIG. 1. The SCR may be scaled down in size to handle down to 70% of the volume flow, preferably down to 50 volume percent depending upon the outlet NO emission requirements. This design is compared to an SCR that does not have the bypass that is dedicated to handling 100% of the flue gas volume. The FIG. 2 is essentially similar to that of the FIG. 1 and functions in the same manner except that the SCR 102 is scaled down in size to depict the lower volume of flue gases that it will have to handle (because of using the bypass line) while releasing a desired volume of $SO_3$. The smaller SCR 102 with its associated bypass line handles the entire flue gas stream while meeting stack $NO_x$ and $SO_3$ requirements, but with a smaller cross-section, fewer catalyst modules, and less structural steel weight.

Bypassing some of the flue gas around the SCR reduces the amount of $SO_3$ produced and may eliminate the need for the addition of specific $SO_3$ control equipment. Reducing $SO_3$ content will also increase the effectiveness of mercury absorbents such as activated carbon. An additional benefit of partial flue gas bypass is easier installation and replacement of fewer catalyst modules over the life of the unit. The bypass design concept involves minimal added cost since a conventional SCR system includes a gas bypass with isolation dampers for other reasons (i.e. unit startup and shutdown).

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, singular forms like "a," or "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term and/or is used herein to mean both "and" as well as "or". For example, "A and/or B" is construed to mean A, B or A and B.

The transition term "comprising" is inclusive of the transition terms "consisting essentially of" and "consisting of" and can be interchanged for "comprising".

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system comprising:
    a selective catalytic reactor; where the selective catalytic reactor is located downstream of a furnace that generates flue gases; the selective catalytic reactor being operative to reduce nitrogen oxides to nitrogen;
    a bypass line; the bypass line being in fluid communication with the selective catalytic reactor; the bypass line contacting an input line to the selective catalytic reactor, where the bypass line is adapted to handle a volume of flue gases that are diverted from the selective catalytic reactor;
    a first control damper disposed at an inlet to the selective catalytic reactor; and
    a second control damper that is disposed at an inlet to the bypass line; where the first control damper and the second control damper interact to divide the flue gas stream between the selective catalytic reactor and the bypass line in ratio that is effective to reduce the amount of sulfur trioxide released from the system to a desirable value, further comprising a $SO_3$ analyzer and a controller, where the $SO_3$ analyzer is disposed downstream of the selective catalytic reactor and where the controller is in operative communication with the $SO_3$ analyzer, and the first control damper and the second control damper.

2. The system of claim 1, further comprising a first isolation damper disposed upstream of the first control damper and another isolation damper disposed upstream of the second control damper.

3. The system of claim 2, where the controller is in operative communication with the first isolation damper and the isolation damper that is disposed upstream of the second control damper.

4. The system of claim 2, where periodic sulfur trioxide measurements are manually made downstream of the selective catalytic reactor and where the results are used to manually or automatically adjust the first control damper and the second control damper.

5. The system of claim 1, where the selective catalytic reactor is smaller in size than a selective catalytic reactor disposed in a comparative system that does not have the bypass line, the first control damper and the second control damper.

6. The system of claim 1, where the selective catalytic reactor receives up to 30 volume percent less flue gas than a selective catalytic reactor disposed in a comparative system that does not have the bypass line, the first control damper and the second control damper.

7. The system of claim 1, where the desirable value is less than 5 ppm based on the total volume percent of the flue gas stream.

8. A method comprising:
discharging a flue gas stream from a furnace to a system comprising:
a selective catalytic reactor; where the selective catalytic reactor is located downstream of a furnace that generates flue gases; the selective catalytic reactor being operative to reduce nitrogen oxides to nitrogen; and
a bypass line; the bypass line being in fluid communication with the selective catalytic reactor; the bypass line contacting an input line to the selective catalytic reactor, where the bypass line is adapted to handle a volume of flue gases that are diverted from the selective catalytic reactor;
dividing the flue gas stream between the selective catalytic reactor and the bypass line in a ratio that is effective to reduce the amount of sulfur trioxide released from the system to a desirable value.

9. The method of claim 8, further comprising the flue gas stream emanating from the selective catalytic reducer by wet chemistry and where the dividing of the flue gas stream is accomplished manually.

10. The method of claim 8, where the dividing of the flue gas stream is accomplished via automation by an in-line analyzer and a controller.

11. The method of claim 8, further comprising discharging an entire portion of the flue gas stream that contains undesirable contaminants via the bypass line.

* * * * *